(12) United States Patent
Rowell et al.

(10) Patent No.: US 11,035,930 B2
(45) Date of Patent: Jun. 15, 2021

(54) ANTENNA MEASUREMENT SYSTEM AS WELL AS METHOD FOR CONTROLLING A MEASUREMENT ANTENNA ARRAY

(71) Applicant: Rohde & Schwarz GmbH & Co. KG, Munich (DE)

(72) Inventors: Corbett Rowell, Munich (DE); Adam Tankielun, Ottobrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 588 days.

(21) Appl. No.: 15/660,569

(22) Filed: Jul. 26, 2017

(65) Prior Publication Data

US 2019/0033428 A1   Jan. 31, 2019

(51) Int. Cl.
*G01S 7/40* (2006.01)
*G01V 3/12* (2006.01)

(52) U.S. Cl.
CPC .............. *G01S 7/4026* (2013.01); *G01V 3/12* (2013.01)

(58) Field of Classification Search
CPC ................................ G01S 7/4026; G01V 3/12
USPC .................................................. 342/174, 202
See application file for complete search history.

(56) References Cited

U.S. PATENT DOCUMENTS

| 7,825,858 | B2 * | 11/2010 | Blessing | G01S 13/933 342/442 |
| 8,401,506 | B2 * | 3/2013 | Yu | H04W 24/06 324/627 |
| 2003/0090276 | A1 * | 5/2003 | Weide | G01N 22/00 324/663 |
| 2011/0095950 | A1 * | 4/2011 | Yu | H04W 24/06 343/703 |
| 2016/0301453 | A1 * | 10/2016 | Sanderovich | H04B 7/08 |
| 2016/0359573 | A1 * | 12/2016 | Pauly | H04B 17/21 |

* cited by examiner

*Primary Examiner* — Bo Fan
(74) *Attorney, Agent, or Firm* — Christensen O'Connor Johnson Kindness PLLC

(57) ABSTRACT

An antenna measurement system is described, comprising a device under test and a measurement antenna array. Said measurement antenna array comprises a plurality of antenna elements. Said measurement antenna array is positioned in the near field of said device under test. Said measurement antenna array is positioned such that the main orientation of said measurement antenna array is inclined with respect to the boresight of said device under test and said measurement antenna array. Further, a method for controlling a measurement antenna array is described.

15 Claims, 2 Drawing Sheets

ANTENNA MEASUREMENT SYSTEM AS WELL AS METHOD FOR CONTROLLING A MEASUREMENT ANTENNA ARRAY

FIELD OF THE DISCLOSURE

Embodiments of the present disclosure relate generally to an antenna measurement system as well as a method for controlling a measurement antenna array.

BACKGROUND

In the state of the art, antenna measurement systems are known that are used for near field measurements of a device under test, in particular its radiation pattern. Typically, a measurement antenna array is used that is placed close to the device under test in order to be positioned within the near field of the device under test such that the near field characteristics of the device under test can be determined appropriately.

However, it has turned out that the radar cross section (RCS) of the measurement antenna array is large while being positioned directly opposite of the device under test with its active side. The active side of the measurement antenna array is defined by the face side of the measurement antenna array that comprises the several antenna elements of the antenna array which are connected with each other wherein these antenna elements work together as a single antenna.

In the prior art, the measurement antenna array is oriented such that the active side faces the device under test directly such that a boresight between the measurement antenna array, in particular its active side, and the device under test is perpendicular with respect to the surface of the active side of the measurement antenna array.

In general, the perpendicular of the face side of the measurement antenna array, in particular its active side, defines the main orientation of the measurement antenna array whereas the boresight relates to the direct connection of a center of the measurement antenna array, in particular its active side, with the device under test.

Hence, the main orientation of the measurement antenna array and the boresight between the measurement antenna array and the device under test coincidence in the state of the art.

The large radar cross section occurring in the state of the art results in higher reflection properties of the measurement antenna array which in turn disturb the measurements as the reflected signal portions interfere with the signals to be measured for determining the near field characteristics.

SUMMARY

There is a need for an antenna measurement system as well as a method for controlling a measurement antenna array which ensures a simple and accurate measurement.

Embodiments of the present disclosure provide an antenna measurement system comprising a device under test and a measurement antenna array, the measurement antenna array comprising a plurality of antenna elements, the measurement antenna array being positioned in the near field of the device under test, the measurement antenna array being positioned such that the main orientation of the measurement antenna array is inclined with respect to the boresight of the device under test and the measurement antenna array.

Accordingly, the radar cross section (RCS) is minimized as the main orientation is inclined with respect to the boresight. Thus, the near field characteristics of the device under test are measured when the main orientation and the boresight do not coincidence with each other. Due to this arrangement, the signals are reflected by the measurement antenna array such that they do not interact with the signals originating from the device under test as the reflected signals are not reflected towards the device under test. In fact, the signal portions reflected pass the device under test laterally. Therefore, disturbing interferences can be avoided resulting in improved measurement results. Under operation of the antenna measurement system, the boresight corresponds to the direction of the signals transmitted by the device under test wherein the signal portions are reflected by a reflection angle which is divided into two halves by the main orientation of the measurement antenna array. One half of the reflection angle is called inclination angle as the main orientation of the measurement antenna array is inclined with respect to the boresight by that inclination angle in order to reduce the radar cross section. Hence, the measurement antenna array is tilted appropriately.

Generally, the antenna elements are configured to receive and/or transmit electromagnetic waves. In some embodiments, the measurement antenna array may be configured to transmit and/or receive plane wave(s). For instance, the measurement antenna array is established by a plane wave converter.

Provided that all antenna elements are switched on for transmitting/receiving purposes and that they are distributed homogeneously on that active side, the main orientation of the measurement antenna array corresponds to the antenna axis of the whole measurement antenna array. Further, each individual antenna element has its own antenna axis.

According to an aspect, at least one of the boresight and the main orientation originates from a center of the measurement antenna array, in particular a center at the front face. In some embodiments, both the boresight and the main orientation originate from the center of the measurement antenna array such that a common reference point is provided for the main orientation as well as the boresight.

The individual antenna axes of the plurality of antenna elements are orientated differently with respect to the boresight, in particular inclined by a certain angle. The orientation of each individual antenna axis may correspond to the main orientation of the measurement antenna array such that they are also inclined by the inclination angle.

According to another aspect, the main direction is perpendicular to an active side of the device under test with regard to electromagnetic waves. Accordingly, the boresight is inclined with respect to the active profile. The active side may be defined by a plane, namely an antenna plane, which comprises the individual antenna elements of the antenna array.

Moreover, the measurement antenna array may be configured to be rotated about its center. Thus, the measurement antenna array may have different positions each being defined by a certain inclination angle of the main orientation with respect to the boresight being fixed. Therefore, different radar cross sections can be established for measurement purposes. For instance, different beam steering directions can be measured appropriately while rotating the measurement antenna array.

According to another aspect, the measurement antenna array comprises a base plate to which the plurality of antenna elements are mounted. Therefore, the plurality of antenna elements may be distributed over the base plate defining the basis of the measurement antenna array. The base plate may also comprise the antenna plane, for instance at its front face. Alternatively, the individual antenna elements may be partly received within the base plate. However, the directional characteristics of the individual antenna elements are orientated perpendicular to the front face of the base plate.

Further, the base plate may be rotated about its center point with respect to an initial measurement plane of the measurement antenna array, the initial measurement plane being perpendicular to the boresight. Accordingly, the base plate and the antenna elements mounted thereon are rotated about the center point such that the antenna elements are swiveled about the center point out of the initial measurement plane. The distances of the antenna elements with respect to the device under test are different for each individual antenna element depending on its location at the measurement antenna array.

In some embodiments, the main orientation is perpendicular to the base plate. Thus, the antenna elements are mounted on one common side of the base plate, namely the front face, such that the antenna axes of the individual antenna elements are orientated into one direction being inclined with respect to the boresight. The inclination of the antenna axes corresponds to the one of the main orientation. Hence, the antenna axes are also inclined with respect to the boresight by the inclination angle.

Another aspect provides that the base plate is a printed circuit board. Thus, a cost efficient measurement antenna array can be provided as the antenna elements as well as the control circuit(s) required for controlling the individual antenna elements can be established on a common part.

According to another aspect, the measurement antenna array has a first portion being located closer to the device under test and a second portion being located farther from the device under test. As the measurement antenna array is swiveled around its center point, two different portions are provided being distanced differently with respect to the device under test. The rotation results in the inclined main orientation with respect to the boresight. However, the geometric dimensions of both portions may be the same.

In some embodiments, the first portion comprises more active antenna elements than the second portion. The total number of active antenna elements can be reduced appropriately for the measurements due to the rotation of the measurement antenna array.

Furthermore, the second portion may comprise parasitic antenna elements. These parasitic antenna elements are used to influence the radiation pattern of the active antenna elements located in the second portion. The parasitic antenna elements may be located in a surrounding and/or interspersed manner with regard to the active antenna elements of the second portion.

The first portion may also comprise parasitic antenna elements. However, the number of the parasitic antenna elements for the first portion is less than the one for the second portion.

Furthermore, both the first and the second portion have the same density of antenna elements. Accordingly, the difference with regard to the number of active antenna elements is compensated by the number of parasitic antenna elements allocated to the second portion. In other words, the number of active and passive antenna elements is the same for both portions.

In addition, the radiation pattern of each active antenna element may be the same. Therefore, the parasitic antenna elements influence the individual radiation pattern of each active antenna element such that it is ensured that all active antenna elements have the same individual radiation pattern. Accordingly, the radiation pattern of an active antenna element in the first portion is the same as the one of an active antenna element in the second portion.

According to another aspect each of the antenna elements is switchable such that at least each individual antenna element can be controlled to be an active or a passive one. A passive antenna element relates to a parasitic antenna element with respect to neighboring antenna elements. This ensures that the radiation pattern of the active antenna elements can be altered in a desired manner.

Moreover, the antenna elements may be controlled in groups. Thus, neighboring antenna elements with respect to a certain antenna element may be controlled such that they correspond to parasitic antenna elements when switched off appropriately.

Generally, the controlling of the antenna elements can also be used for calibration purposes.

Furthermore, the measurement antenna array, in particular the printed circuit board and the individual antenna elements, may establish a beam forming/steering device.

Moreover, a method for controlling a measurement antenna array is provided, with the following steps:
providing a device under test;
providing a measurement antenna array;
placing the measurement antenna array in the near field of the device under test; and
rotating the measurement antenna array such that its main orientation passes the device under test laterally.

Thus, the main orientation of the measurement antenna array does not intersect the device under test as it passes the device under test laterally. The main orientation corresponds to the perpendicular of the active side or rather the face side of the measurement antenna array. Therefore, the radar cross section (RCS) of the measurement antenna array is reduced appropriately since signal portions reflected at the measurement antenna array are not reflected back towards the device under test, but to the sides. Accordingly, it is prevented that the measurements are impaired by the signal portions reflected.

According to an aspect, the main orientation is inclined with respect to the boresight of the device under test and the measurement antenna array. This inclination results in a reduction of the radar cross section of the measurement antenna array. The inclination is defined by the inclination angle.

According to another aspect, the measurement antenna array comprises a plurality of antenna elements, the plurality of antenna elements are controlled such that a first portion being located closer to the device under test has more active antenna elements than a second portion being located farther from the device under test due to the rotation. The rotation of the measurement antenna array results in a reduction of the radar cross section of the measurement antenna array. However, the rotation also influences the beam characteristics of the measurement antenna array. This influence is compensated by controlling the individual antenna elements of the measurement antenna array in an appropriate manner. In fact, the portion of the measurement antenna array being located closer to the device under test is controlled such that more active antenna elements are used for the measurement with regard to the second portion. Accordingly, the antenna characteristics of the whole measurement antenna array are adapted appropriately depending on the rotation, in particular the inclination angle.

Further, the measurement antenna array may be rotated into another position such that the main orientation is inclined with respect to the boresight of the device under test and the measurement antenna array by another angle, for instance a second inclination angle. Therefore, beam steering/forming properties, in particular appropriate directions of the beam characteristics, of the measurement antenna array and/or the device under test may be covered which could not be covered by the first inclination angle.

In general, the measurement antenna array may be controlled such that different inclinations of the main orientation with respect to the boresight are provided which ensures that different beam steering directions are covered by the measurements.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawing, wherein

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
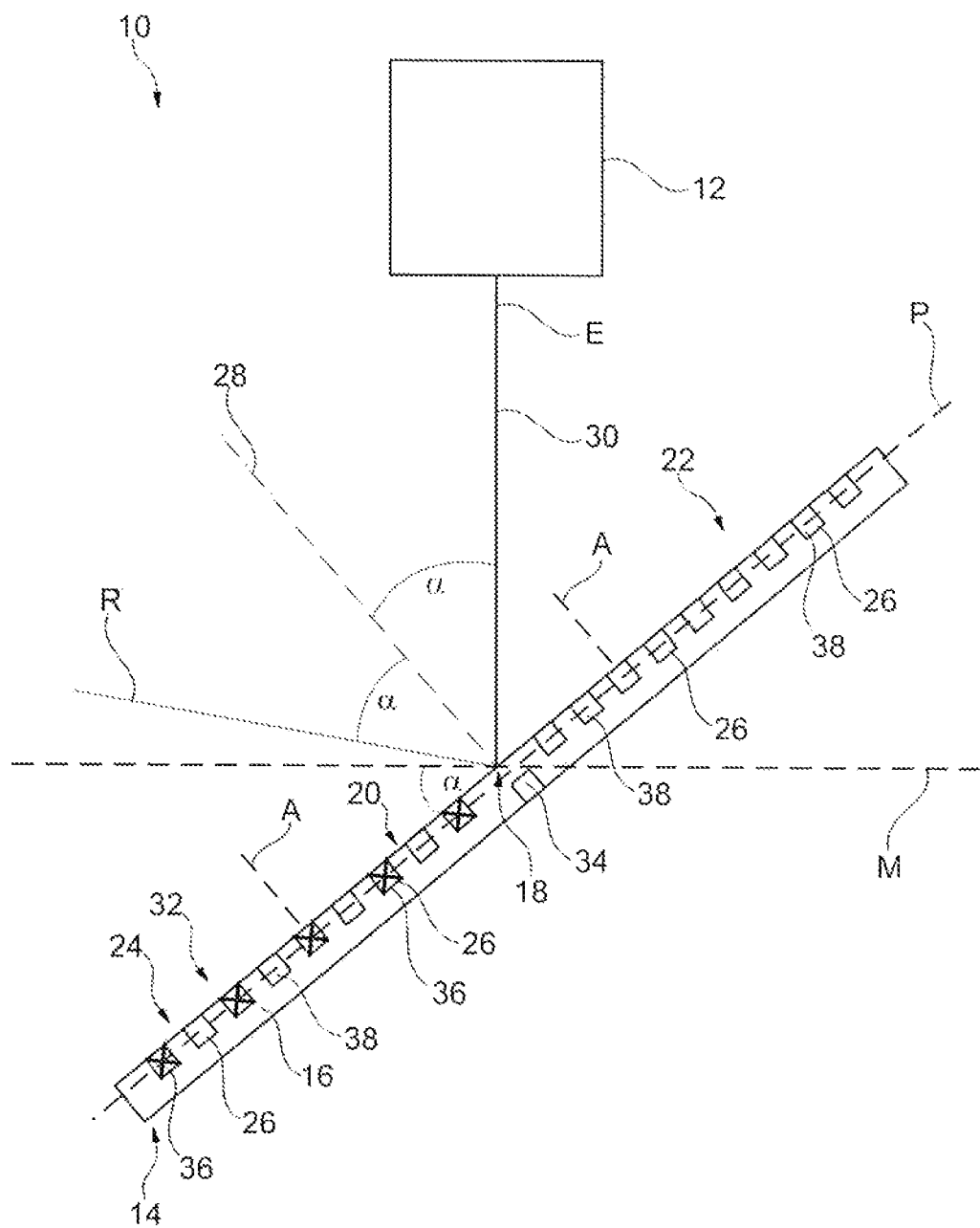
FIG. 1 shows a schematic overview of one representative embodiment of an antenna measurement system according to the disclosure in a first position.

In FIG. 1, an antenna measurement system 10 is shown that is used for measuring the electromagnetic properties of a device under test 12. The antenna measurement system 10 comprises the device under test 12 that is placed opposite to a measurement antenna array 14. The measurement antenna array 14 comprises a base plate 16 having a center point 18 at a face side 20 oriented towards the device under test 12. The center point 18 is located in an initial measurement plane M (illustrated by dashed lines).

As shown in FIG. 1, the measurement antenna array 14 is swiveled about its center point 18 such that it is swiveled out of the initial measurement plane M at least partly. The center point 18 remains in the initial measurement plane M. Therefore, the measurement antenna array 14 comprises two portions 22, 24 wherein the first portion 22 is located closer to the device under test 12 with respect to the second portion 24 that is located farther away from the device under test 12.

The first portion 22 of the measurement antenna array 14 is also located closer to the device under test 12 than the initial measurement plane M whereas the second portion 24 of the measurement antenna array 14 is located farther from the device under test 12 than the initial measurement plane M.

Moreover, the measurement antenna array 14 comprises a plurality of antenna elements 26 that are distributed over the whole base plate 16, in particular at the face side 20 in a two dimensional pattern comprising rows and columns. In fact, the individual antenna elements 26 are mounted on the base plate 16 of the measurement antenna array 14. Each of the antenna elements 26 has its own antenna axis A being perpendicular to the face side 20 of the measurement antenna array 14 as illustrated in FIG. 1.

Further, the measurement antenna array 14 has a common main orientation 28 that is inclined with respect to a boresight 30 between the device under test 12 and the measurement antenna array 14 by an inclination angle α. As shown in FIG. 1, both the boresight 30 and the main orientation 28 originate from the center point 18 of the measurement antenna array 14. However, the main orientation 28 is inclined by the inclination angle α with respect to the boresight 30 that extends towards the device under test 12. In contrast thereto, the main orientation 28 of the measurement antenna array 14 passes the device under test 12 laterally.

The main orientation 28 and the antenna axes A of each antenna element 26 are perpendicular with respect to an active side 32 of the measurement antenna array 14 with regard to the electromagnetic waves. Thus, the main orientation 28 and the antenna axes A are perpendicular with respect to the base plate 16.

The active side 32 may be defined by an antenna plane P wherein the individual antenna elements 26 are located in this antenna plane P. The antenna plane P and the face side 20 are parallel to each other. The antenna plane P and the face side 20 may also coincidence with each other.

Due to the inclination of the base plate 16 with respect to the initial measurement plane M, an actual measurement plane is provided that is inclined by the inclination angle α with respect to the initial measurement plane M. The actual measurement plane corresponds to the antenna plane P or rather the face side 20.

The antenna measurement system 10 is used for measuring the electromagnetic properties of the device under test 12 while transmitting and/or receiving electromagnetic waves that are transmitted by the device under test 12, for instance. The radar cross section (RCS) of the measurement antenna array 14 is reduced due to the inclined orientation as shown in FIG. 1 as signal portions reflected at the measurement antenna array 14 are not reflected towards the device under test 12 as they pass the device under test 12 laterally.

Further, the antenna measurement system 10 comprises a control unit 34 that is used to control the different antenna elements 26, in particular for switching the individual antenna elements 26. The base plate 14 may be established by a printed circuit board such that the individual antenna elements 26 as well as the control unit 34 are established on the same part of the antenna measurement system 10, in particular the measurement antenna array 14.

For instance, the antenna elements 26 are controlled by the control unit 34 such that some of the antenna elements 26 of the second portion 24 are switched off in order to act as parasitic antenna elements 36 (passive antenna elements) that do not transmit and/or receive any electromagnetic signals. This is indicated by an "x" in FIG. 1 with regard to the dedicated antenna elements 26. Accordingly, the first portion 22 being closer to the device under test 12 comprises more active antenna elements 38 than the second portion 24.

Even though not shown in FIG. 1, the first portion 22 may also comprise antenna elements 26 being switched off such that they act as parasitic antenna elements 36 (passive antenna elements).

Generally, both the first and second portion 22, 24 have the same density of antenna elements 26 such that the number of active antenna elements 38 can be adjusted, in particular by controlling the individual antenna elements 26 appropriately.

The parasitic antenna elements 36 may be located such that they surround and/or intersperse the active antenna elements 38. In general, the parasitic antenna elements 36 influence the radiation pattern of each individual antenna element 26.

Generally, the antenna elements 26 are controlled such that the directional characteristics of the measurement antenna array 14 are adjusted, in particular with regard to the inclination angle α set.

For adjusting the radiation pattern of the whole measurement antenna array 14, the individual antenna elements 26 may be controlled in groups such that groups are switched off in order to provide a group of parasitic antenna elements 36 if necessary. However, the exact control of the individual antenna elements 26 depends on the inclination angle α.

Accordingly, a calibration of the measurement antenna array 14 and/or the device under test 12 may take place appropriately.

In general, the antenna measurement system 10, in particular the measurement antenna array 14, is controlled by providing the device under test 12 and the measurement antenna array 14.

The device under test 12 and the measurement antenna array 14 are positioned in the near field of each other in order to determine the near field characteristics of the device under test 12 appropriately. Then, the measurement antenna array 14, in particular the base plate 16, is rotated about its center point 18 in order to set a certain inclination angle α.

Due to the rotation, the main direction 28 of the measurement antenna array 14 being perpendicular to the face side 20 or rather the antenna plane P is inclined with respect to the boresight 30 as shown in FIG. 1.

Generally, the boresight 30 relates to the incoming direction E of the electromagnetic waves wherein these waves are partially reflected in the reflective direction R. Both, the incoming and the reflective direction E, R are inclined with respect to the main direction 28 by the inclination angle α.

Figure 2:
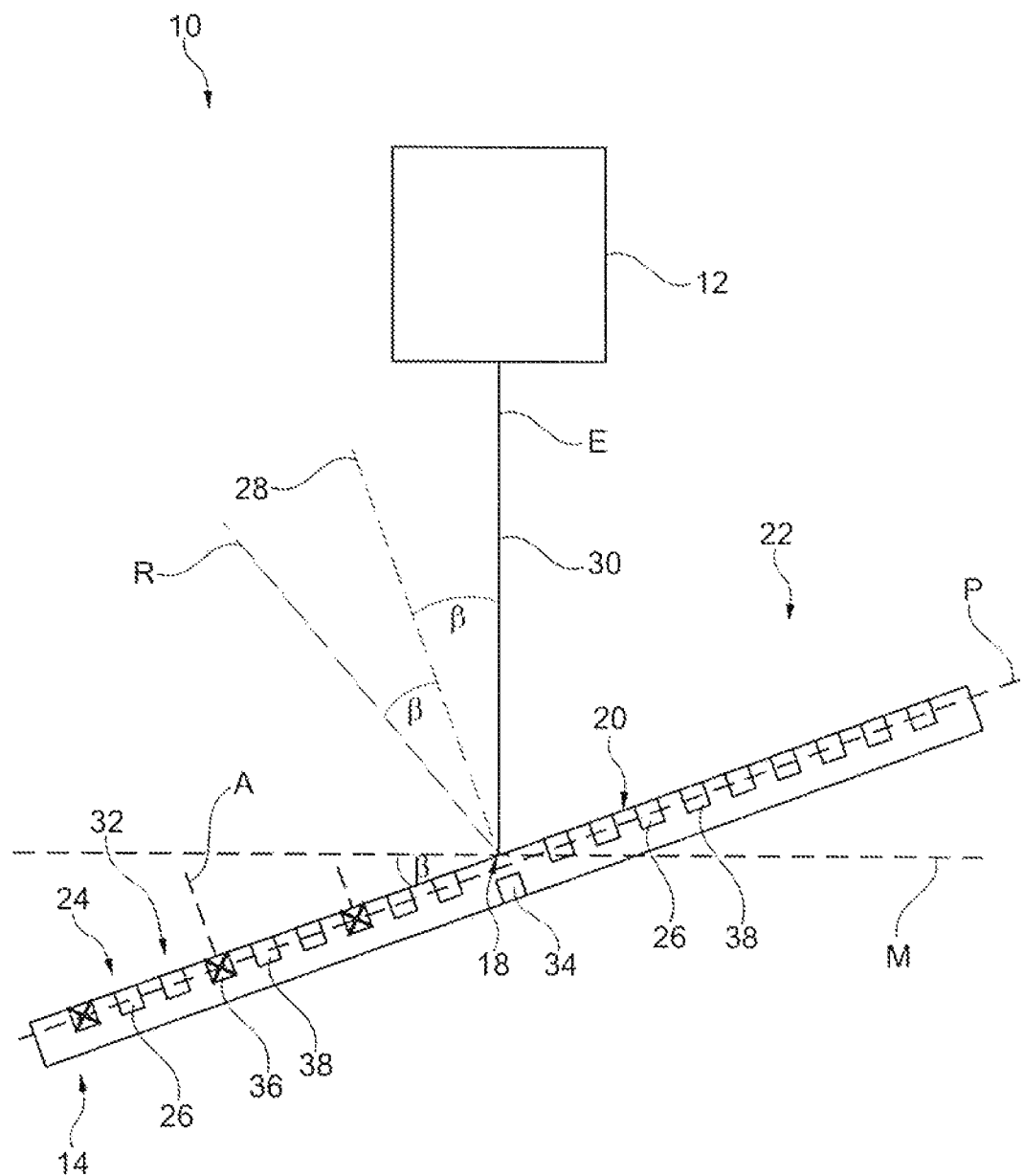
FIG. 2 shows a schematic overview of the antenna measurement system shown in FIG. 1 in a second position.

The measurement antenna array 14 can be rotated into different positions as shown in FIG. 2 such that different inclination angles can be set.

In FIG. 2, a second position of the antenna measurement system 10 is shown wherein the measurement antenna array 14 has been rotated about its center point 18 such that the antenna plane P or rather the face side 20 is inclined by a second inclination angle β with respect to the initial measurement plane M.

Accordingly, the main orientation 28 is also inclined by the second inclination angle β with respect to the boresight 30 of the device under test 12 and the antenna array 14 as already discussed.

In this configuration, different beam steering directions of the antenna array 14 can be covered which have not been covered by the first position shown in FIG. 1. Accordingly, it is ensured that all relevant beam steering/forming directions can be covered by the antenna measurement system 10 while performing measurements in different positions.

As shown in FIG. 2, the individual antenna elements 26 may be controlled in a different manner in order to ensure that the overall radiation pattern of the measurement antenna array 14 is similar to the one used in FIG. 1.

In general, the radar cross section (RCS) of the measurement antenna array 14 is reduced due to its rotation about its center point 18 as signal portions being reflected by the measurement antenna array 14 are not reflected towards the device under test 12 which might impair the measurement. In fact, these reflected signal portions pass the device under test 12 laterally. Thus, the measurements performed by the antenna measurement system 10 are more reliable due to the reduction of misinterpretation and/or unwanted intereferences.

Nevertheless, the antenna characteristics of the whole measurement antenna array 14 are ensured with regard to quality while controlling the individual antenna elements 26 appropriately.

The control unit 34 described above may include, in some embodiments, logic to control, for example, the switching (on/off) of the individual antenna elements 26. This logic of the control unit 34 can be carried out in either hardware or software, or a combination of hardware and software. In some embodiments, the control unit 34 includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof. In an embodiment, the control unit 34 includes a microprocessor and a memory storing logic modules and/or instructions. In an embodiment, the control unit 34 includes one or more ASICs having a plurality of predefined logic components. In an embodiment, the control unit 34 includes one or more FPGA having a plurality of programmable logic components.

In an embodiment, the control unit 34 includes hardware circuit implementations (e.g., implementations in analog circuitry, implementations in digital circuitry, and the like, and combinations thereof). In an embodiment, the control unit 34 includes combinations of circuits and computer program products having software or firmware instructions stored on one or more computer readable memories that work together to cause a device to perform one or more methodologies or technologies described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An antenna measurement system comprising:
   a device under test and a measurement antenna array, said measurement antenna array comprising a plurality of antenna elements, said measurement antenna array being positioned in the near field of said device under test, said measurement antenna array being positioned such that the main orientation of said measurement antenna array is inclined with respect to the boresight of said device under test and said measurement antenna array, wherein the boresight relates to the direct connection of a center of the measurement antenna array with the device under test.

2. The antenna measurement system according to claim 1, wherein at least one of said boresight and said main orientation originates from the center of said measurement antenna array, in particular a center at the front face.

3. The antenna measurement system according to claim 1, wherein said main direction is perpendicular to an active side of said device under test with regard to electromagnetic waves.

4. The antenna measurement system according to claim 1, wherein said measurement antenna array is configured to be rotated about its center.

5. The antenna measurement system according to claim 1, wherein said measurement antenna array comprises a base plate to which said plurality of antenna elements are mounted.

6. The antenna measurement system according to claim 5, wherein said base plate is rotated about its center point with respect to an initial measurement plane of said measurement antenna array, said initial measurement plane being perpendicular to the boresight.

7. The antenna measurement system according to claim 5, wherein said main orientation is perpendicular to said base plate.

8. The antenna measurement system according to claim 5, wherein said base plate is a printed circuit board.

9. The antenna measurement system according to claim 1, wherein said measurement antenna array has a first portion being located closer to said device under test and a second portion being located farther from said device under test.

10. The antenna measurement system according to claim 9, wherein said first portion comprises more active antenna elements than said second portion.

11. The antenna measurement system according to claim 9, wherein said second portion comprises parasitic antenna elements.

12. The antenna measurement system according to claim 9, wherein both said first and said second portion have the same density of antennas.

13. The antenna measurement system according to claim 1, wherein the radiation pattern of each active antenna element is the same.

14. The antenna measurement system according to claim 1, wherein each of said antenna elements is switchable such that at least each individual antenna element can be controlled to be an active or a passive one.

15. The antenna measurement system according to claim 1, wherein said antenna elements are controlled in groups.

* * * * *